US007331717B2

(12) United States Patent
Kiani et al.

(10) Patent No.: US 7,331,717 B2
(45) Date of Patent: Feb. 19, 2008

(54) FLEXIBLE OPTICAL INTERCONNECTION SYSTEM

(75) Inventors: Sepehr Kiani, Watertown, MA (US); Richard F. Roth, Brookline, NH (US); John A. Lehman, Bedford, NH (US)

(73) Assignee: Amphenol Corporation, Wallingford, CT (US)

( * ) Notice: Subject to any disclaimer, the term of this patent is extended or adjusted under 35 U.S.C. 154(b) by 0 days.

(21) Appl. No.: 10/882,598

(22) Filed: Jul. 1, 2004

(65) Prior Publication Data

US 2006/0002659 A1    Jan. 5, 2006

(51) Int. Cl.
*G02B 6/36* (2006.01)
(52) U.S. Cl. ........................................................ 385/53
(58) Field of Classification Search ...................... None
See application file for complete search history.

(56) References Cited

U.S. PATENT DOCUMENTS

| | | | |
|---|---|---|---|
| 5,121,454 A | 6/1992 | Iwano et al. | |
| 5,429,521 A * | 7/1995 | Morlion et al. | 439/108 |
| 5,909,526 A | 6/1999 | Roth et al. | |
| 5,915,058 A | 6/1999 | Clairardin et al. | |
| 6,076,975 A | 6/2000 | Roth | |
| 6,079,881 A | 6/2000 | Roth | |
| 6,081,647 A | 6/2000 | Roth et al. | |
| 6,108,482 A | 8/2000 | Roth | |
| 6,154,597 A | 11/2000 | Roth | |
| 6,179,475 B1 | 1/2001 | Takamatsu et al. | |
| 6,315,590 B1 * | 11/2001 | Grois et al. | 439/248 |
| 6,240,229 B1 | 4/2002 | Clairadin et al. | |
| 6,450,698 B1 | 9/2002 | Chen et al. | |
| 6,461,053 B1 * | 10/2002 | Mayercik et al. | 385/56 |
| 6,592,268 B2 | 7/2003 | Chen et al. | |
| 6,604,861 B2 * | 8/2003 | Chen et al. | 385/56 |
| 6,607,401 B1 * | 8/2003 | Weaver et al. | 439/608 |
| 6,644,866 B1 | 11/2003 | Kusuda et al. | |
| 2002/0072267 A1 * | 6/2002 | Bowling et al. | 439/358 |
| 2002/0106162 A1 * | 8/2002 | Loder et al. | 385/53 |
| 2003/0044125 A1 | 3/2003 | Kiani et al. | |
| 2003/0044127 A1 * | 3/2003 | Roth et al. | 385/88 |
| 2004/0008494 A1 | 1/2004 | Roth | |
| 2004/0052472 A1 | 3/2004 | Roth et al. | |
| 2005/0135752 A1 | 6/2005 | Kiani et al. | |
| 2005/0135755 A1 | 6/2005 | Kiani et al. | |

FOREIGN PATENT DOCUMENTS

EP              0 494 759       7/1992

* cited by examiner

*Primary Examiner*—Michelle Connelly-Cushwa
*Assistant Examiner*—Chris Chu
(74) *Attorney, Agent, or Firm*—Blank Rome LLP

(57) ABSTRACT

An optical connector system assembled from modular components. These components include connector modules that position ferrules for mating and providing fine alignment to fibers. The modules are assembled to support members to form connectors of various sizes. Mounting modules are attached to the support members. Various shaped mounting modules are provided, allowing connectors to be assembled for various configurations, such as a matrix configuration, a parallel board-to-board configuration or a panel mount configuration.

38 Claims, 10 Drawing Sheets

FLEXIBLE OPTICAL INTERCONNECTION SYSTEM

BACKGROUND

1. Field of the Invention

The present invention relates generally to electronic systems and more specifically to interconnections between subassemblies of an electronic system.

2. Discussion of Related Art

Optical interconnections are known in the art. Optical fibers are used in networking and electronic systems to carry large amounts of data. However, it has traditionally been difficult to make connections between optical fibers. Misalignment of the fibers or contamination of the mating surfaces of the fiber can significantly degrade the performance of the optical data link.

In many applications, optical fibers are joined by a splice, which is intended to be a permanent connection of the fibers. However, there are many applications where a separable connection between optical fibers is desired. In these applications, it would be desirable if connections to an optical fiber could be made as easily as a connection to a traditional wire cable carrying electrical signals. For these applications, optical connectors have been developed. The optical connectors allow cables to be joined, thus acting as a separable splice for optical fibers to be connected to a circuit board or other assembly.

Optical fibers are sometimes used to route signals between circuit boards in an electronic assembly. In these applications, the optical fibers are configured much like a traditional backplane connector in an electronic assembly, allowing boards to be inserted or removed from the assembly.

FIG. 1 shows a portion of an electronic system 100 in which signals are carried through optical fibers, such as those illustrated at 150 and 152. Backplane 100 has multiple backplane connectors 112A and 112B mounted to it. Fibers 150 terminate within backplane connector 112B. Other fibers not shown would terminate in other connectors, as might the free ends of fibers 150. In the illustrated embodiment, fibers that form a portion of the backplane 100 route optical signals between backplane connectors.

Fibers 152 connect at one end to optical components (not shown) on daughter card 120A. The other ends of these fibers terminate in daughter card connector 122A.

When electronic system 100 is assembled, daughter cards 120A and 120B are inserted into a card cage or other mechanical support system such that the daughter card connectors mate with the backplane connectors. Connectors that mate when pressed together are called "blind mate" connectors because there is no need for a person to have physical access to the connectors for proper mating. As they mate, the connectors provide alignment of the optical fibers so that optical signals readily pass from one daughter board to another through the backplane.

The connector system shown in FIG. 1 depicts the HD OPTX™ connector system sold by Teradyne, Inc. The system is constructed from modules. One type of module is a connector module, such as connector module 130.

Each connector module contains one or more ferrule carriers, such as 132. The ferrule carrier holds a ferrule (not shown) terminated onto a fiber optic cable to create a cable assembly. A ferrule is a precision manufactured component that holds the ends of optical fiber exposed at a surface and contains alignment features that allow two ferrules, when brought together, to precisely align the fiber ends.

The connector modules are held in a support member. In the daughter card connectors 122A and 122B, the connector modules are attached to a metal bar 134, sometimes called a "stiffener," which acts as a support module. In backplane connectors, 122A and 112B, the connector modules are held in a housing 136, which might also be constructed of metal, and is the support module in the backplane connectors. Connectors of different sizes may be formed by using differently sized support modules.

The connectors also include latching modules. Daughter card connectors, 122A and 122B, include latching modules, such as latching module 162. Backplane connectors, 112A and 122B include latching modules, such as 164. Latching modules serve as a point of attachment of the connectors to the daughter card or the backplane. Each latching module has a surface pressed against the board. Attachment features on that surface are pressed into holes in the daughter card. The attachment features deform to make a tight fit in the holes to hold the daughter card connectors to the daughter card. Likewise, screws passing through the backplane engage the latching modules 164 in the backplane connectors and hold the backplane connectors to the backplane.

Latching module 162 includes a blade portion 166. Blade portion 166 fits into an opening in latching module 164 and engages features within latching module 164, thereby holding the connectors together. However, the preferred latching arrangement allows relative compliant motion between backplane connectors, such as 112A, and daughter card connectors, such as 122A. Compliance allows alignment features in the connectors and in the ferrules to dictate that final alignment of the optical fibers, even if there is some misalignment of the backplane and daughter cards.

FIG. 1 shows a portion of a backplane system. A typical electronic system might contain a card cage with more daughter cards than shown. Also, the system might include electrical connectors and many other components. FIG. 2 highlights the board-to-board optical connectors.

Further details of the modules of the connector system can be found in United States Patent Application 20040052472 to Roth, et al. entitled TECHNIQUES FOR FORMING FIBER OPTIC CONNECTIONS IN A MODULARIZED MANNER; United States Patent Application 20040008494 to Roth, entitled TECHNIQUES FOR CONNECTING A SET OF CONNECTING ELEMENTS USING AN IMPROVED LATCHING APPARATUS; United States Patent Application 20030044127 to Roth, et al., entitled, MODULAR FIBER OPTIC CONNECTION SYSTEM; United States Patent Application 20030044125 to Kiani, et al., entitled WAFERIZED FIBER OPTIC CONNECTOR; United States Patent Application to Kiani, et al., Ser. No. 10/744,050, entitled MODULAR FIBER OPTIC CONNECTOR SYSTEM; U.S. patent application Ser. No. 10/745,475 to Kiani, et al., entitled FIBER OPTIC BULKHEAD—all of the foregoing are hereby incorporated by reference.

While the backplane configuration is widely used in electronic systems, there are other known configurations. For example, in a matrix configuration, printed circuit boards are inserted from both sides of a card cage. The boards inserted from one side are orthogonal to the ones inserted from the other. The edge of each board inserted from one side is adjacent an edge of every board inserted from the other side. Electrical connectors have been developed that mount to these edges to move blind mate electrical connections from board to board. In other configurations, the circuitry on a board sends or receives signals through a cable that runs external to the card cage holding the printed circuit boards of an electronic system. To make electrical connections to a cable, a connector on a board in the electronic system might extend through an opening in a panel that forms a wall of an enclosure for the electronic system. Such connectors are known as panel mount connectors.

Though electrical connectors for matrix and panel applications are known, it would be desirable to have optical connectors that could be readily used in more applications, such as matrix configurations and panel configurations. It would be highly desirable to easily adapt connectors developed for backplane configurations to be used in other configurations.

SUMMARY OF THE INVENTION

The invention relates to an improved optical connector system. In one aspect, the invention relates to an electronic assembly that has a first plurality of circuit boards, the first plurality of printed circuit boards disposed in the assembly generally parallel to each other, each of the first plurality of printed circuit boards having a forward edge. A second plurality of circuit boards is disposed in the assembly generally parallel to each other and generally orthogonal to the first plurality of printed circuit boards, each of the second plurality of printed circuit boards having a forward edge, with the forward edge of each of the second plurality of printed circuit boards facing a forward edge of the first plurality of printed circuit boards. A first plurality of optical connectors are mounted on a forward edge of one of the first plurality of circuit boards. A second plurality of optical connectors is each mounted on a forward edge of one of the second plurality of circuit boards, each of the second plurality of optical connectors shaped to form a blind-mate optical connection with one of the first plurality of optical connectors.

In another aspect, the invention relates to an optical connector adapted for mounting to a surface of a circuit board, the optical connector having a surface facing the printed circuit board. The connector has a connector assembly with at least one optical connector module and a mounting module. A mounting bracket has a first member and a second member at a right angle to the first member. The first member is adapted for attachment to the circuit board and the second member is coupled to the mounting module to provide a compliant coupling between the at least one optical connector and the circuit board.

In yet another aspect, the invention relates to an optical connector adapted for mounting to a surface of a circuit board, the optical connector having a surface facing the printed circuit board. The connector has a connector assembly with at least one optical connector module and a mounting module and a mounting bracket having an L-shaped cross section. The mounting bracket has a first member and a second member at a right angle to the first member. The first member is adapted for attachment to the circuit board and the second member is coupled to the mounting module.

In yet another aspect, the invention relates to a method of providing optical connectors. Optical connector components suitable for use in assembling an optical connector system are provided. The optical connector components include optical connector modules; support modules, each configured to hold at least one optical connector module in a connector subassembly; first type mounting members adapted to engage a support module and to mount a connector subassembly to a circuit board; and second type mounting members adapted to engage a support module and mount a subassembly to a circuit board and position the subassembly to mate with a connector subassembly mounted to a circuit board with the first type mounting member when the circuit board containing the connector with the second type mounting member is positioned in an assembly at a right angle to the circuit board containing the first type mounting members. Third type mounting members are provided. The third type mounting members are adapted to engage a support module and mount a first connector subassembly to an electronic system and position the first connector subassembly to mate, in other than a right angle backplane configuration, with a second connector subassembly with a second type mounting member attached thereto.

In yet a further embodiment, the invention relates to an electronic assembly that has a first plurality of circuit boards, the first plurality of printed circuit boards disposed in the assembly generally parallel to each other, each of the first plurality of printed circuit boards having a forward edge. A second plurality of circuit boards is disposed in the assembly generally parallel to each other, each of the second plurality of printed circuit boards having a forward edge, with the forward edge of each of the second plurality of printed circuit boards facing a forward edge of the first plurality of printed circuit boards. A first plurality of optical connectors are mounted on a forward edge of one of the first plurality of circuit boards. A second plurality of optical connectors is each mounted on a forward edge of one of the second plurality of circuit boards, each of the second plurality of optical connectors shaped to form a blind-mate optical connection with one of the first plurality of optical connectors. In some embodiments, the first plurality of boards and the second plurality of boards are parallel to each other.

BRIEF DESCRIPTION OF THE DRAWINGS

The foregoing and other features and advantages of the present invention will be apparent from the following non-limiting discussion of various embodiments and aspects thereof with reference to the accompanying drawings, in which like reference numerals refer to like elements throughout the different figures. In the drawings.

DETAILED DESCRIPTION

Figure 1:
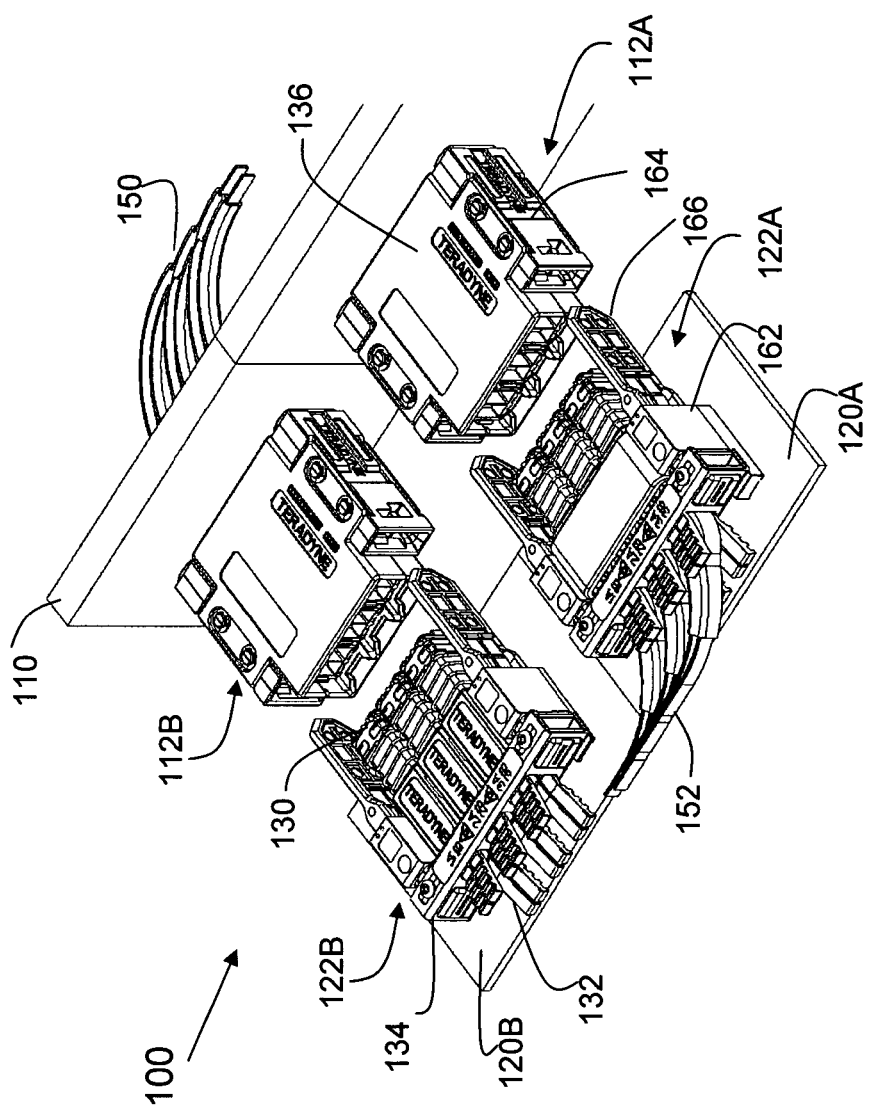
FIG. 1 is a sketch of a prior art optical backplane connection system.

Optical connector systems for configurations other than a traditional backplane daughter card configuration are described. An advantage of the described embodiments is that they can be readily formed from modules of a backplane connector system such as is shown in FIG. 1. A particular advantage is that connectors for alternative configurations are formed through the addition of relatively inexpensive mounting components. Portions of the connector system that provide alignment of the connector and alignment of the fibers within the connectors, which often require precision manufacturing, are the same as in the backplane connector configuration.

Figure 2:
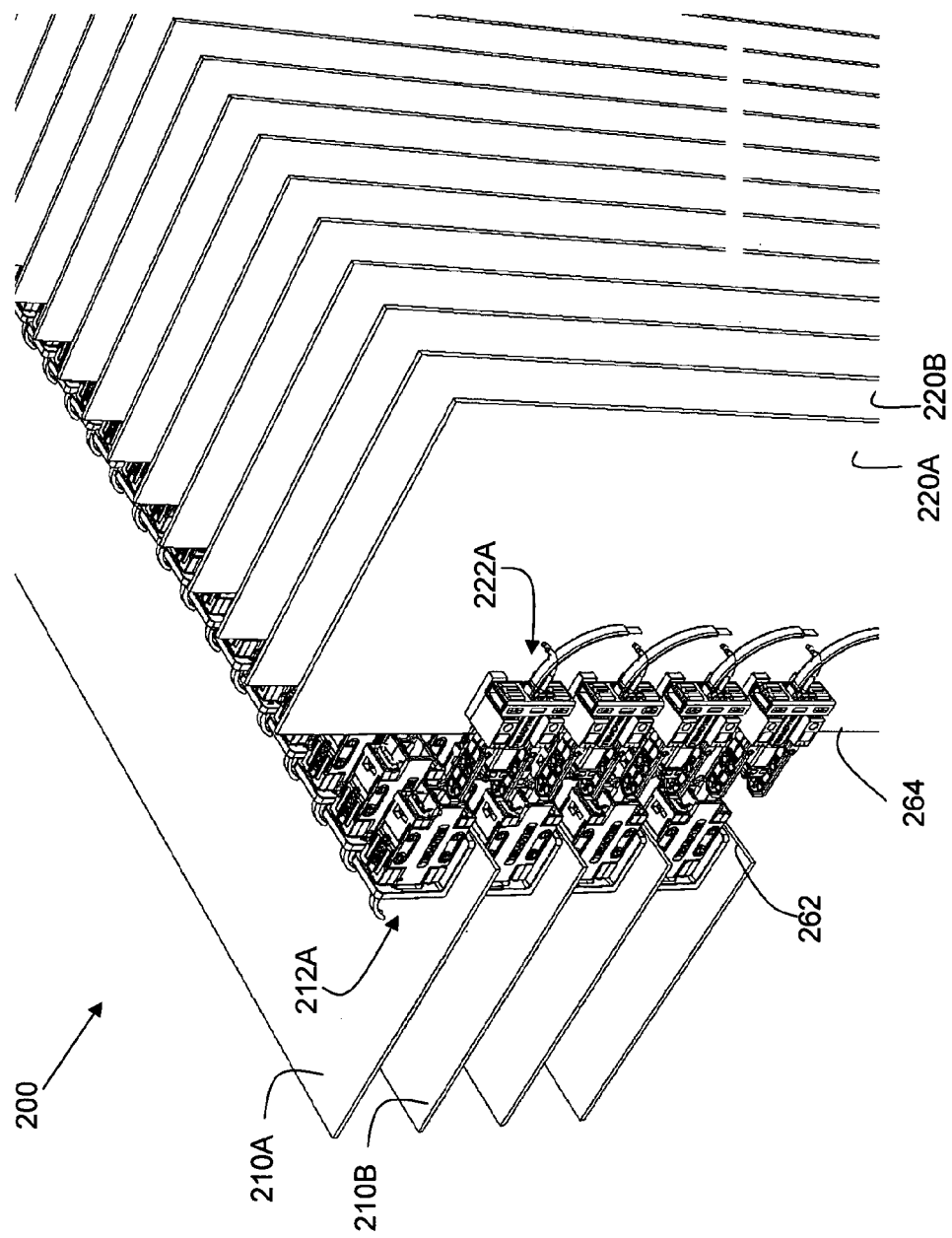
FIG. 2 is a sketch of an optical connection system in a matrix configuration.

FIG. 2 shows a matrix configuration. The matrix configuration includes multiple horizontal boards, of which 210A and 210B are numbered. The system also includes multiple vertical boards, of which 220A and 220B are numbered. Both horizontal and vertical boards might include electronic components (not shown). Some of those components receive optical signals coupled to those components through fibers that are connected to other portions of the system through connectors as will be described below.

In assembling the system, horizontal boards, such as 210A and 2101B, are inserted into a card cage from one side of the system. The vertical boards, such as 220A and 220B, are inserted into the card cage from the other side of the system. The forward edges of the horizontal boards, such as edge 262, face the forwarded edges of the vertical boards such as edge 264. Connectors mounted near the forward edges 262 and 264 can mate to form connections for signals between a horizontal board and a vertical board. Preferably, these connectors are blind mate connectors.

FIG. 2 shows connectors such as 212A mounted on horizontal boards. Connectors such as 222A are mounted on vertical boards. In the illustrated embodiment, each horizontal board is connected to each vertical board and each vertical board is connected to each horizontal board. It is not, however, necessary that all horizontal boards be connected to all vertical boards. The numbers and sizes of the connectors used to interconnect a particular horizontal board to a particular vertical board will be determined by the system application.

Figure 3:
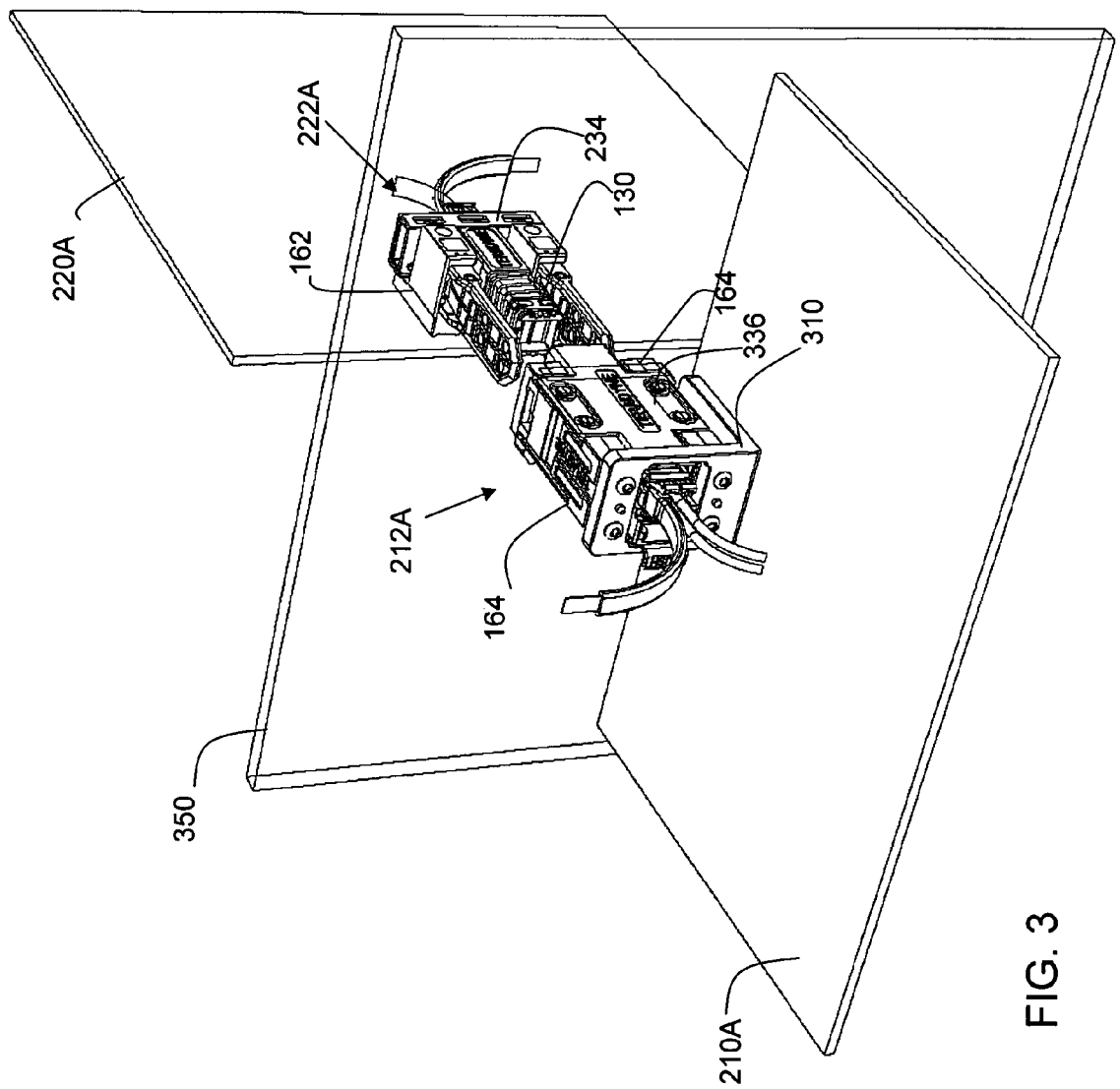
FIG. 3 is an enlarged view of a portion of the connection system of FIG. 2.

Turning to FIG. 3, a mating pair of connectors is shown in greater detail. FIG. 3 shows a connector 212A mounted to a horizontal board 210A and a connector 222A mounted to a vertical board 220A. In the illustrated embodiment, connector 222A may be the same as a daughter card connector such as 122A (FIG. 1). Connector 222A is mounted to vertical board 220A using mounting modules 162 such as shown in FIG. 1.

Here, a single connector module 130 is shown in connector 222A. Connectors with any number of connector modules might be mounted as shown. The number of connector modules in each connector will preferably be selected based on the number of signals that must be transmitted from one board to the other. The support member 234 in connector 222A is shown to have fewer locations to attach connector modules than support member 134 (FIG. 1) as it only needs to be wide enough to hold one connector module 130. But support member 234 might otherwise have a design the same as support member 134.

Connector 212A may be formed with components similar to those used to form backplane connectors as 112A and 112B in FIG. 1. As with connector 222A, connector 212A here is shown to contain only a single connector module such as 130. The connector module of connector 212A is held within a housing formed by support members such as housing 336. Housing 336 is similar to housing 136 shown in FIG. 1, but sized to house a single connector module.

Connector 212A also employs mounting and latching modules 164 as shown in the connector system of FIG. 1. Latching and mounting modules 164 align with and latch to latching modules 162 on the mating connector 222A. However, unlike as shown in FIG. 1, latching and mounting modules 164 are not connected to a backplane. Rather, mounting and latching modules 164 are attached to a mounting member, here shown as a bracket 310.

FIG. 3 shows that electronic system 200 might include a separator member 350. Separator member 350 is shown positioned between horizontal boards and vertical boards. Where a separator member such as 350 is used, connectors such as 212A and 222A might mate through openings in separator member 350. In some embodiments, a "midplane" might be used as a separator member 350. A midplane might be a printed circuit board similar to a traditional backplane. In other embodiments, the separator member might contain tubes for circulating cooling fluid in the boards in the assembly or perform other functions. FIG. 3 illustrates that horizontal and vertical boards might mate through connectors even if the assembly includes a separator member.

FIG. 3 shows only a single connector pair joining two boards. Different boards might be joined with different sized connectors. For example, some boards might be joined by connectors with two connector modules 130. Other boards might not be joined by optical connectors at all. Yet other boards might be joined by electrical connectors instead of or in addition to the optical connectors shown.

Figure 4:
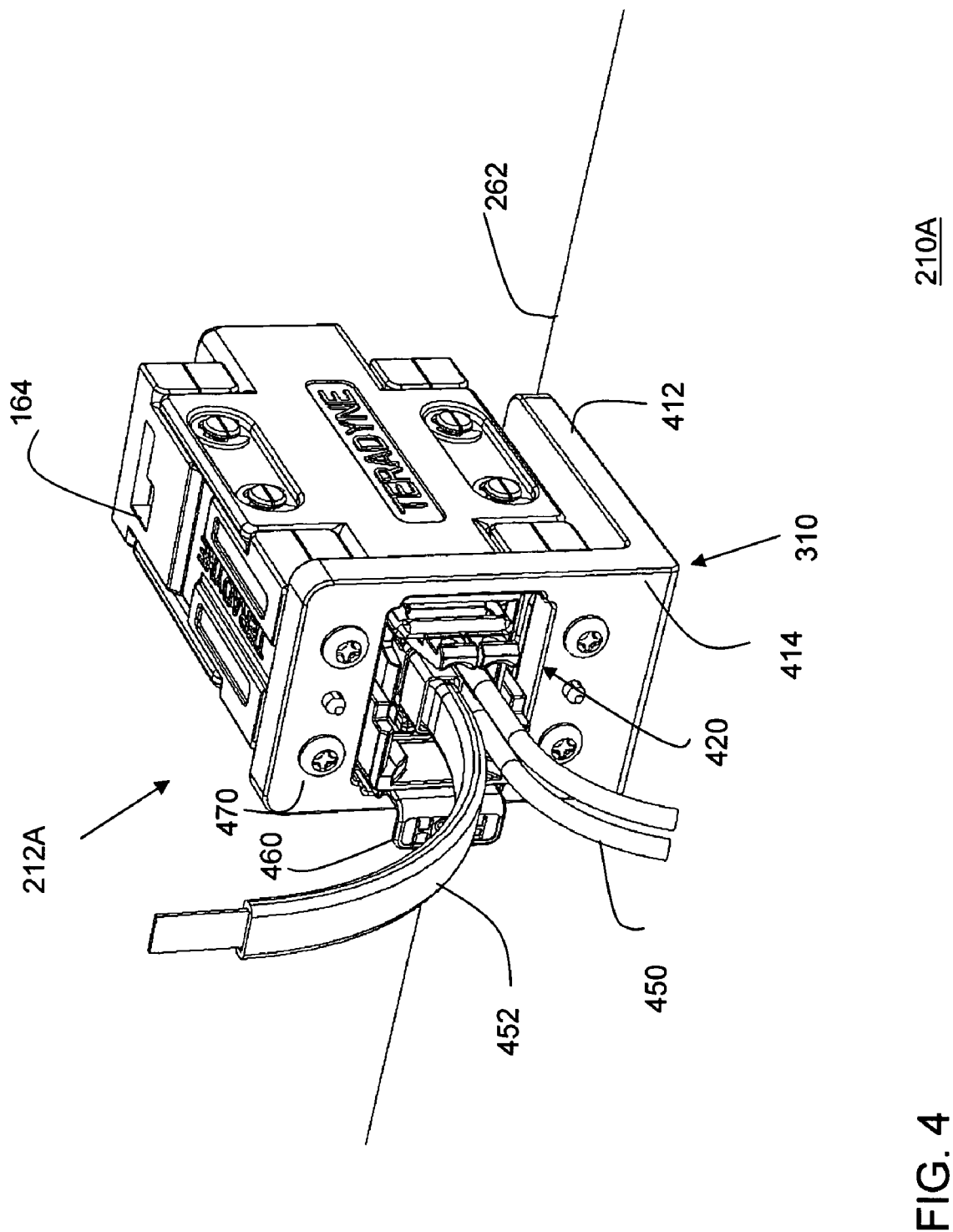
FIG. 4 is an enlarged view showing in greater detail mounting of a connector shown in FIG. 2.

Turning to FIG. 4, additional details of connector 212A may be seen. Bracket 310 is here shown as an L-shaped bracket. Bracket 310 includes a member 412 positioned against the upper surface of board 210A. Preferably, member 412 of bracket 310 is secured to board 210A. Bracket 310 may be secured to board 210A in any convenient means, such as with screws (not shown) or other fasteners passing through board 210 and engaging member 412 or passing from member 412 into board 210.

Bracket 310 in this embodiment includes a second member 414 at right angle to member 412. Mounting and latching modules 164 are secured to member 414 in any convenient means. Preferably, mounting and latching modules 164 are secured to member 414 in the same way that they are secured to a backplane such as 110 sown in FIG. 1. Here, screws such as 470 pass through holes (not shown) in member 414 to engage mounting and latching modules 164. In the prior art, latching modules 164 are mounted to allow compliant motion of a connector to a backplane. Similar compliant motion might be provided in the present application. Alternatively, greater or lesser compliant motion might be provided.

Member 414, also includes an opening 420. Optical fibers such as 450 and 452 pass through opening 420 to be terminated in a connector module 130 within connector 212A. The optical fibers may be packaged as single fibers such as 450 or as an optical fiber ribbon cable such as 452. Connector module 130 will contain a ferrule of the appropriate size and type to terminate the fibers.

Bracket 310 is preferably made of metal. Bracket 310 should have a sufficient mechanical strength to withstand the forces on connector 212A during mating with a complimentary connector such as 222A. Bracket 310 should also withstand forces encountered during insertion and removal of connector module 130 from the connector. In the illustrated embodiment, actuator 460 is pressed towards member 414 to release a connector module 130 from connector 212.

Figure 5:
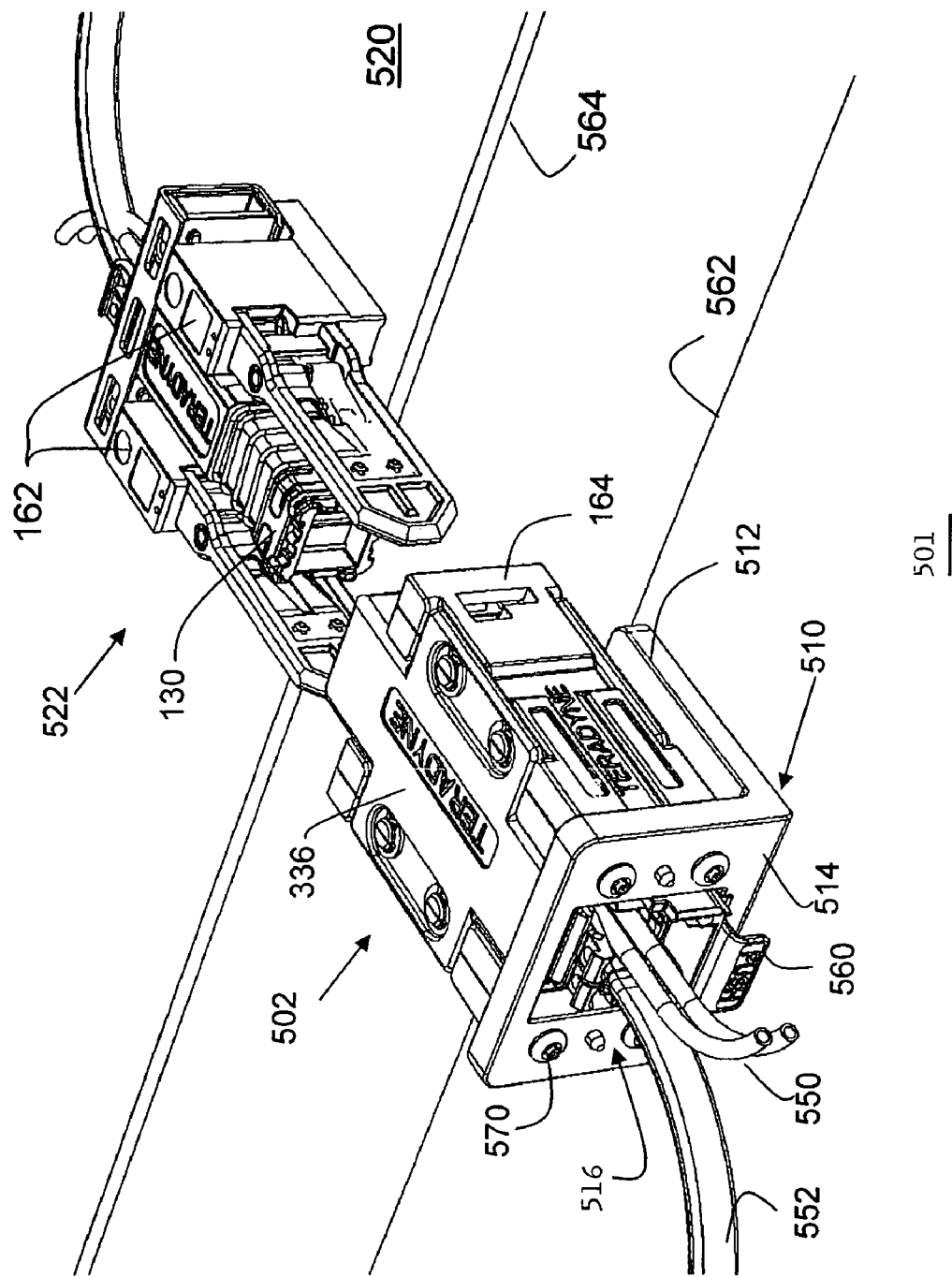
FIG. 5 is a sketch of an optical connection system for a parallel board-to-board configuration.

FIG. 5 shows an alternative mounting configuration. In the configuration of FIG. 5, circuit boards 510 and 522 are generally parallel to each other. The forward edge 562 of board 510 is opposite the forward edge 564 of board 520. To allow routing of optical signals between boards 510 and 520 connectors 502 and 522 are attached to boards 510 and 520, respectively. Connector 502 is mounted adjacent forward edge 562 of board 510. Connector 522 is mounted adjacent forward edge 564 of board 520.

In this configuration, connector 522 is shown to be the same as connector 222A used in a matrix configuration. It maybe assembled from the same components used to make a connector such as 122A for a daughter card in a backplane configuration.

Connector 502 maybe assembled from the same components used to make a backplane connector, such as 112A or 112B, in the backplane configuration. As with connector 212A, connector 502 is formed with a line of modular components held in a housing member 336. Housing member 336 holds a pair of latching and mounting modules 164 in line with a connector module 130. As with the prior connector systems, the number of connector modules used in connector 502 depends on the number of connections that need to be made from board to board. FIG. 5 illustrates a connector 502 with a single connector module but any number of modules might be used to assemble connector 502.

Connector 502 differs from connector 212A (FIG. 4) in the orientation of the connector relative to the board to which it is mounted. The dimensions of the mounting bracket required to hold the connector in the required orientation also differ. In contrast to FIG. 4, the line of modules in the connector is perpendicular to the board. FIG. 5 shows a configuration in which the line of modules in connector 502 runs parallel to the surface of the board.

Mounting member 510 holds the connector 502 in the desired orientation. As in FIG. 4, mounting member 510 is here shown in the form of a bracket. In this embodiment, the bracket is L-shaped, having a member 512 on the surface of board 510. Preferably mounting member is secured to member 510 with fasteners passing through board 510 and engaging member 512. However, any convenient means of attachment may be used.

Mounting member 510 also includes a member 514. In this configuration, member 514 is at a right-angle to member 512. Connector 502 is fastened to member 514. Here, screws 570 are shown passing through member 514 and engaging latching and mounting modules 164 within connector 502. However, any convenient means of attachment might be used.

Member 514 includes an opening 520 through which optical fibers, such as 550 and 552, protrude. These optical fibers such as 550 and 552 are terminated at one end within connector 502. The other ends of these optical fibers 550 and 552 may, for example, be terminated at components (not shown) mounted to board 510.

A release actuator 560 also extends through opening 520. Connector modules such as 130 inserted through opening 520 may be removed by pressing actuator 560.

Figure 6:
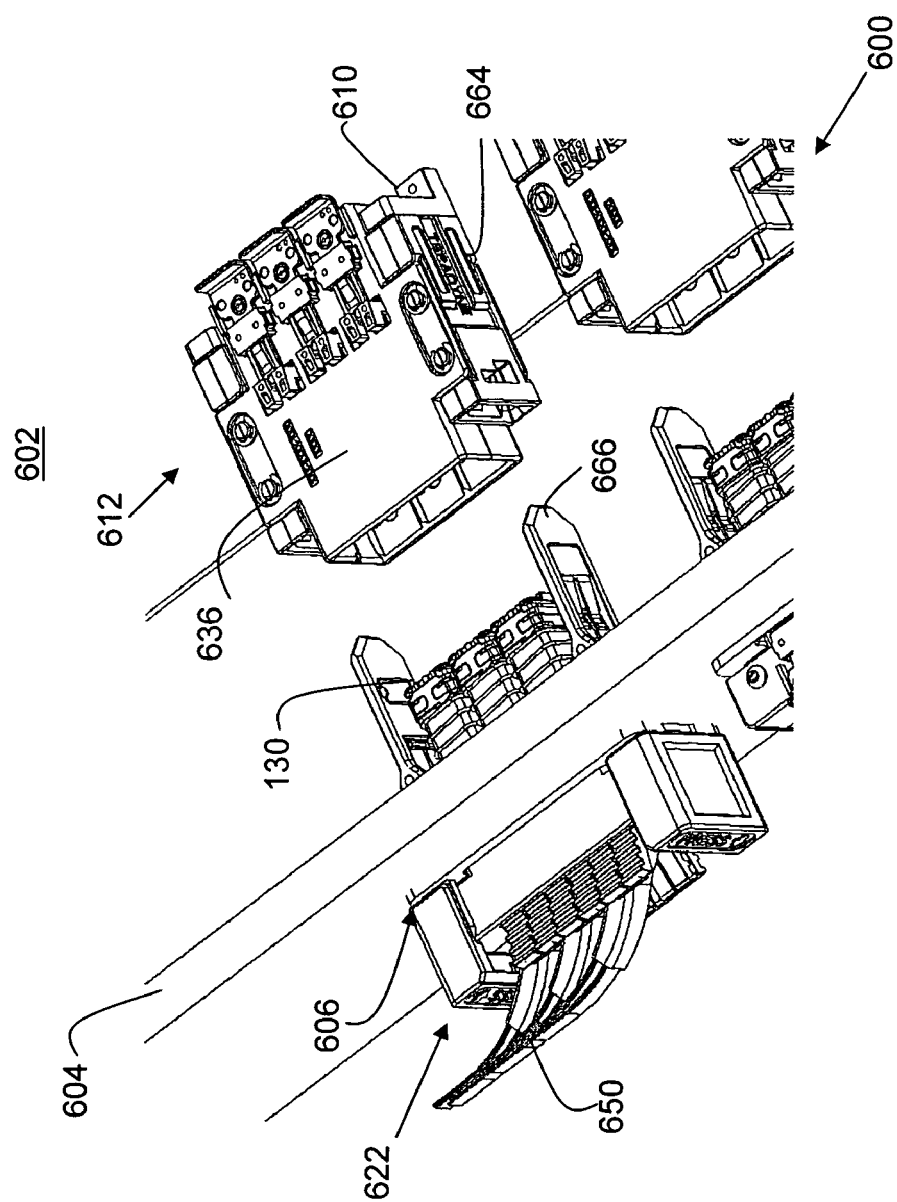
FIG. 6 is a sketch of an optical connector system for a panel mount configuration.

FIG. 6 shows a further configuration for a system 600 employing optical connectors. System 600 includes a panel 604, such as might be on the surface of an enclosure for an electronic system. Panel 604 includes an opening 606 through which a connector such as 622 might be inserted.

Connector 622 is here shown to be a optical connector constructed from a plurality of connector modules such as 130. Fibers such as 650 are terminated inside the connector modules 130 of connector 622, allowing optical signals to be connected to components inside system 600.

Connector 622 also includes blades 666 engage complimentary latching modules, such as 664 on connectors within system 600.

System 600 includes a circuit board 602 on which a connector 612 is mounted. Preferably, board 602 is held in a card cage or a similar mechanical support structure such that connector 612 is positioned to mate with connector 622 when it is mounted through opening 606 in panel 604.

In the illustrated embodiment, connector 612 includes connector modules such as 130 held within a housing 636. Here, connector 622 and connector 612 each contain three connector modules 130.

Figure 8:
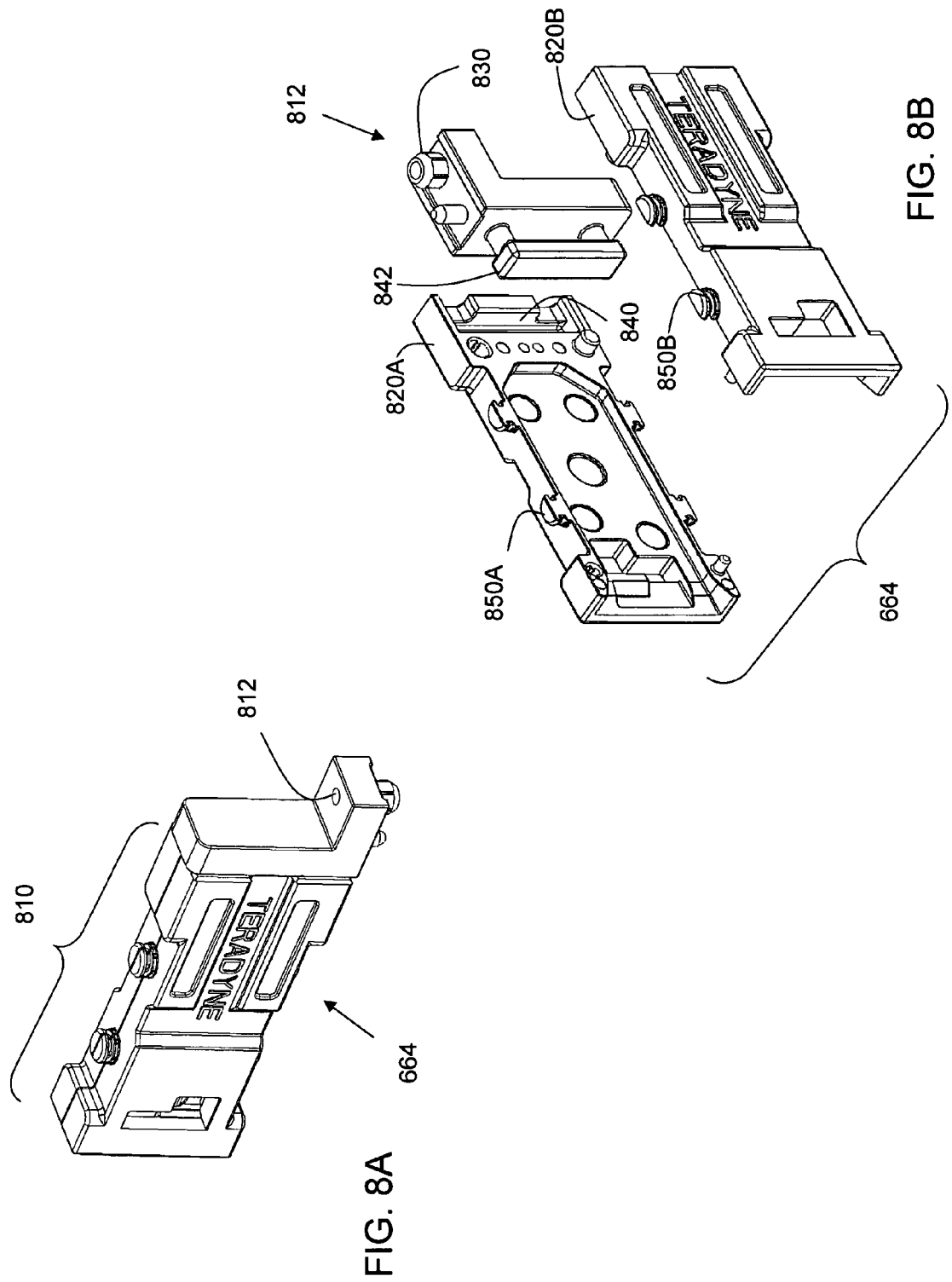
FIG. 8A is a sketch of a latching and mounting module used in the system of FIG. 6.
FIG. 8B is an exploded view of the latching and mounting module of FIG. 8A from an inverse perspective.

Connector 612 includes latching and mounting modules 664. Latching and mounting modules 664 contain portions that engage blades 666 in the same way that modules 164 engage blades 166 in the system shown in FIG. 1. Latching and mounting modules 664 include a rearward portion 610 adapted from mounting connector 612 to board 602. Mounting of connector 612 to board 602 will be described in greater detail below in FIG. 8

Figure 7:
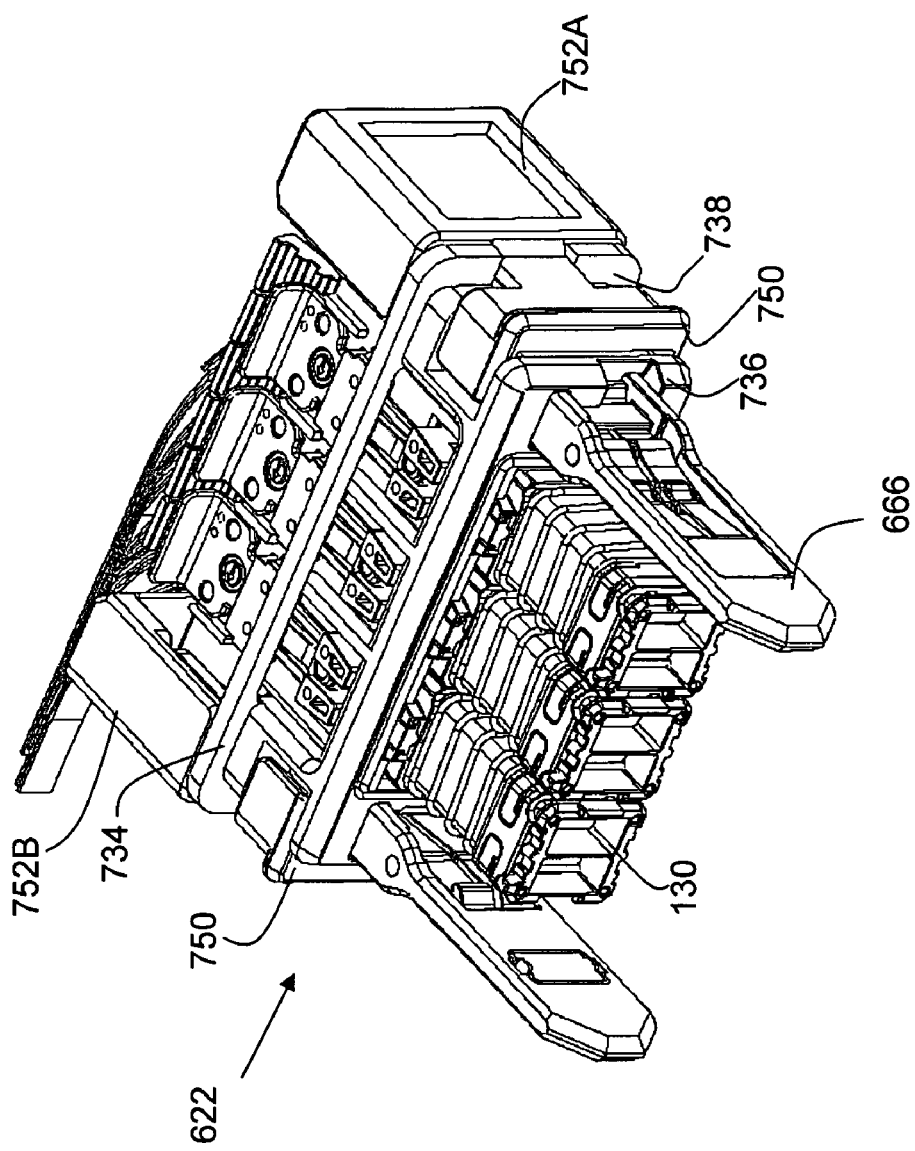
FIG. 7 is a sketch showing in greater detail a cable connector used in the configuration of FIG. 6.

FIG. 7 shows connector 622 in greater detail. Connector modules such as 130 are attached to a support member 734. Support member 734 may be a metal or plastic structure having openings to receive each connector module. It is similar in function to module 162. However, any convenient form of support member might be used.

Here support member 734 has a means to position connector 622 in a panel opening. Support member has a forward portion 736 sized to pass through opening 706. Support member 734 has a rearward portion 738 that is larger than opening 606. When connector 622 is inserted in opening 606 rear portion 738 of support member 734 will press against the outer surface of panel 604, defining the position of connector 622.

Support member 734 includes features to removably attach connector 622 to panel 604. Here, latching features 750 extend beyond the perimeter of forward portion 736 such that they extend beyond the perimeter of opening 606 when connector 622 is fully inserted into panel 604. In the illustrated embodiment, features 750 are slidably mounted to support member 734. To allow connector 622 to be inserted into opening 606, features 750 may slide towards portion 736. Projections 750 may have a tapered surface as shown in FIG. 7 such that when connector 622 is pressed into an opening in panel 604, member 750 will be pressed towards portion 736. Features 750 are preferably spring biased into the extended position shown in FIG. 7. Once connector 622 is pressed sufficiently far into a panel opening 606, projections 750 will return to the extended position, thereby engaging the interior surface of a panel 604. Support member 734 is also shown to include handles 752A and 752B. Handles 752A and 752B are mechanically coupled to latching members 750. When handle 752A is pressed towards handle 752B, latching members 750 retract, thereby allowing connector 622 to be removed from an opening in panel 604. In some embodiments, handles 752A and 752B might need to be pressed together to easily insert connector 622 into a panel opening.

FIG. 8A shows latching and mounting module 664 in greater detail. Latching and mounting module 664 includes a forward portion 810. Forward portion 810 may be structurally the same as the forward portion of latching in attachment module 164 as used in the connector system of FIG. 1. Forward portion 810 is shaped to engage a blade such as 666 (FIG. 7) on connector 622.

FIG. 8B shows an exploded view of latching and mounting module 664. The forward portion 810 is formed by two wall members 820A and 820B. The wall members 820A and 820B have hub portions such as 850A and 850B projecting from them. Wall member 820A and 820B might be held together in any convenient means. For example an E clip might surround hub protections 850A and 850B when pressed together.

Each of the wall members 820 and 820B includes a slot such as 840 visible wall member 820A. When wall portions 820A and 820B are pressed together, slide member 842 on rearward portion 812 is captivated in slot 840. By captivating slide portion 842 in slot 840, rear portion 812 is held to forward portion 810. However, a small amount of relative motion between forward portion 810 and rearward portion 812 is allowed. This motion provides compliance to the connector assembly in a direction perpendicular to a board to which the connector is mounted. Providing compliance to the connector assembly ensures that the mating position of connectors such as 622 and 612 is not constrained by the positioning of the board 602 relative to panel 604. Rather, the mated position may be controlled by features on the connector, which facilitates more accurate fiber alignment.

Rear portion 812 includes a lower surface that presses against the surface of board 602 when connector 612 is mounted. The lower surface includes attachment features 830. These attachment features hold connector 612 to board 602. FIG. 8B shows attachment features in the form of a hub that may be press fit into a hole on the surface of circuit board 602. Attachment 830 additionally include a post to prevent rotation about the hub. However, any convenient form of attachment feature might be used. For example, screws passing through a circuit board 602 might be secured to rear portion 812.

Figure 9:
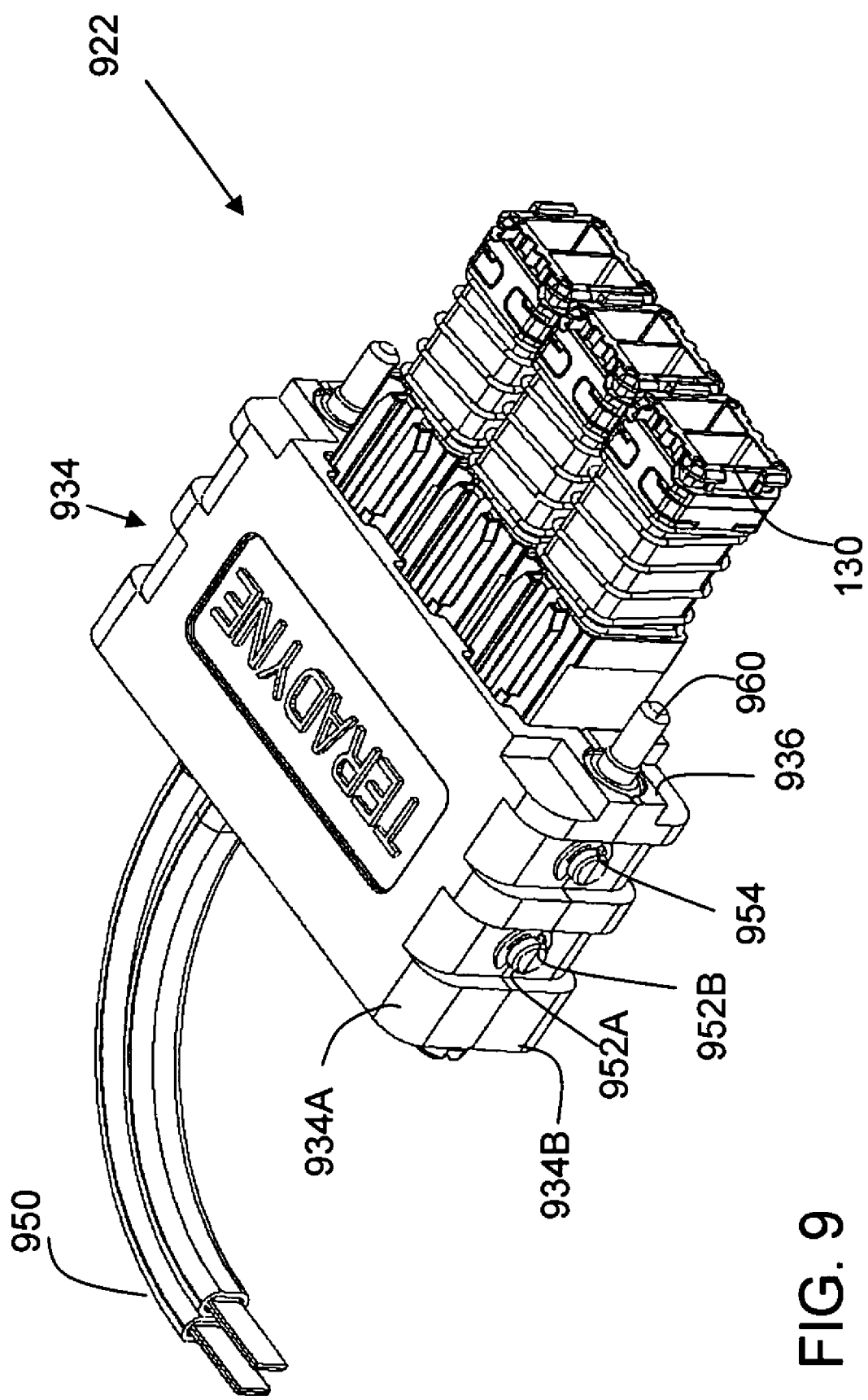
FIG. 9 is a sketch of an alternative embodiment of a cable connector.

FIG. 9 shows an alternative embodiment of a cable connector that might be used in a panel mount configuration.

Connector 922 has a support member 934, similar in function to support member 734 (FIG. 7). Connector 922 also employs a different means to removably attach the connector to a panel.

Connector 922 is shown to contain three connector modules 130 that terminate fibers such as 950. Connector modules are held in a support structure 934. In this embodiment, support structure 934 has an upper portion 934A and a complimentary lower portion 934B. Hubs such as 952A on upper portion 934A align with hubs such as 952B on lower portion 934B. An E-clip, such as 954 surrounds hubs such as 952A and 952B holding portions 934A and 934B together. This is just one potential method for securing the halves. Any of a number of conventional mounting means could be used. Portions 934A may be shaped the same as portion 934B. Preferably, when the two portions 934A and 934B are secured together, they will create channels into which connector modules 130 may be inserted.

Figure 10:
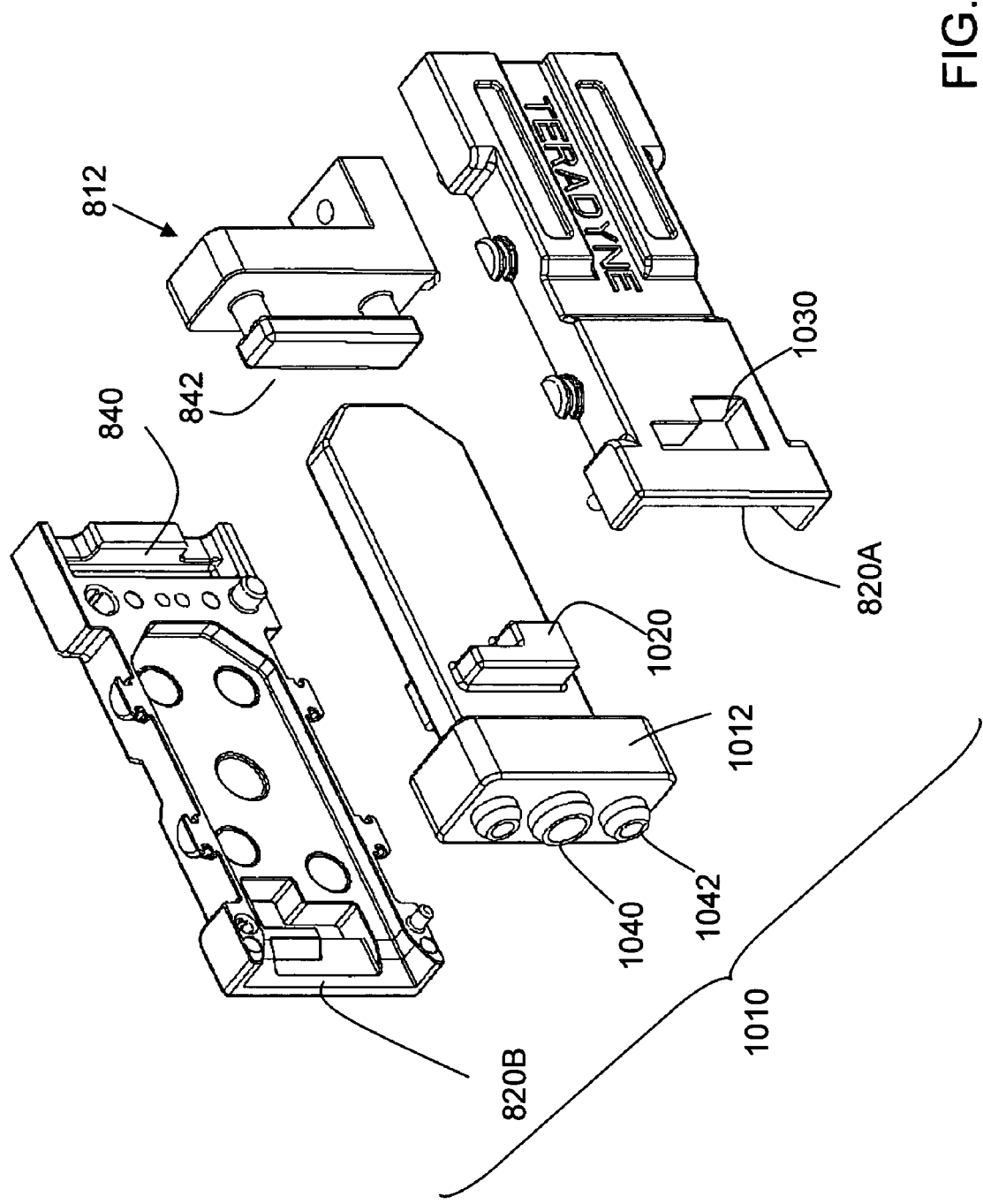
FIG. 10 is an exploded view of an alternative embodiment of the latching and mounting module suitable for use with the cable connector of FIG. 9.

Portions 934A and 934B are shaped to leave a channel that captures screws 960 when the portions 934A and 934B are secured together. Screws 960 provide an alternative mechanism for removably attaching a connector to a panel. When connector 922 is installed in a panel such as 604, the connector modules 130 will project through an opening such as 606. Preferably surface 936 will not pass through the opening 606, but will press against the face of panel 604. Screws 960 will pass through holes (not shown) in panel 604. Pressing surface 936 against the face of panel 605 may form an EMI seal along the front face of the connector. An additional gasket (not shown) could also be used to take up any remaining gap for better sealing. Screws 960 take the place of a latching module for holding connector 922 to the panel.

Where a panel connector in the form of connector 922 is used, a module such as 1010 (FIG. 10) might be used in place of a latching and mounting module such as 664 shown in FIG. 8A. As shown in FIG. 10, mounting module 1010 may be constructed from many of the same components as are used to construct a latching and mounting module 664. Module 1010 includes side portions 820A and 820B as are used to construct a module 664. Likewise a rear portion 812 is used to construct a module 1010.

Module 1010 additionally includes a blade portion 1012 that is not intended to separate from module 1010 when in use. FIG. 10 shows one embodiment of attachment features that secure blade portion 1012 in module 1010. Blade portion 1012 includes projections, such as 1020, that fit within openings 1030 in side portions 820A and 820B. When side portions 820A and 820B are secured together, projections 1020 become locked in openings 1030, preventing removal of blade portion 1020.

Blade portion 1012 includes attachment features on its forward face (not numbered for holding a connector such as 922). Attachment features in any convenient form might be used but will preferably mate with a complementary attachment featured on a mating connector. FIG. 10 shows hubs 1040 serving as a means to secure a connector using mounting modules such as 1010 to a connector such as 922. In use, hubs such as 1042 might be pressed into holes in panel 604, creating an interference fit. Hole 1040 is a threaded hole designed to receive screws such as 960. In use, screws 960 engage holes 1040, thereby holding the cable connector assembly 922 to a connector assembly mounted to a circuit board inside the electronic system assembly.

Having thus described various illustrative, non-limiting embodiments and aspects thereof, modifications and alterations will be apparent to those of skill in the art.

For example, the matrix configuration is described as having horizontal and vertical boards. These descriptions correspond with orientations traditionally used in a matrix configuration. However, functioning of the connector system does not depend on orientation and these designations are for illustration only.

Further the connectors are described as having specific configurations on specific type boards. The connector positions might be reversed. For example, connectors shown mounted on horizontal boards might be mounted on vertical boards and vice-versa.

In addition, some elements of the interconnection system are shown as a single piece and others are shown as multiple pieces. In some cases, it will be possible to assemble single piece components from separate pieces. In other cases, it might be possible to incorporate features from separate pieces into a single piece. For example, connector systems were described as having separate support members and latching and mounting modules. It would be possible to form a support member with latching and mounting features such that the latching and mounting module would be one region of the support member rather than a separable component.

Also, connectors are shown mounted to circuit boards. Such circuit boards might be printed circuit boards of the type widely used in electronic systems. Such printed circuit boards facilitate the case of electronic components in connection with optical interconnects. However, circuit boards or cards as described herein need not include conductive electrical traces as in a conventional printed circuit board.

FIG. 2 shows a plurality of connectors mounted along an edge of a board such as 210A. Each connector is shown with a mounting bracket such as 310. A single, elongated bracket might be used to which all of the connectors on the board are attached. Such a configuration might provide benefits from requiring fewer mounting holes or increasing the planarity of the board.

Such modifications and alterations are intended to be included in this disclosure, which is for the purpose of illustration and explanation and not intended to define the limits of the invention. The scope of the invention should be determined from proper construction of the appended claims, and their equivalents.

What is claimed is:

1. An optical connector adapted for mounting to a panel, the optical connector comprising:
    a) a connector assembly containing a latching module formed by two wall members pressed together to captivate a slide member in a slot formed between the wall members; and
    b) a single-piece mounting bracket adapted for attachment to the panel and extending outwardly from the panel and coupled to the connector assembly, wherein the mounting bracket is rigidly attached to the panel and the connector assembly is compliantly coupled to the mounting bracket via the slide member.

2. The optical connector of claim 1 additionally comprising a plurality of fasteners attaching the panel to the mounting bracket.

3. The optical connector of claim 1 wherein the mounting bracket has a projection adapted to engage a hole in the panel.

4. The optical connector of claim 1 wherein the mounting bracket has an opening therethrough, and wherein the optical connector is accessible through the opening.

5. The optical connector of claim 4 additionally comprising optical fiber passing through the opening.

6. The optical connector of claim 4 additionally comprising an actuator for ejecting the optical connector through the opening.

7. The optical connector of claim 1, wherein the connector assembly is mounted to the panel in an electronic assembly comprising a plurality of panels in a matrix configuration.

8. The optical connector of claim 1, wherein the connector assembly is coupled to the panel in an electronic assembly, the electronic assembly further having a separator panel with an opening therethrough, the connector assembly positioned in the opening.

9. The optical connector of claim 8 wherein the connector assembly has a forward end adjacent the panel, the forward end having an opening therein adapted to receive a fastener from a mating connector.

10. The optical connector of claim 1, wherein the panel has a top surface and the connector assembly extends substantially parallel to the top surface of the panel.

11. The optical connector of claim 1, wherein the connector assembly has a front end and a back end and the mounting bracket has a forward-facing surface which faces a leading edge of the panel, the back end of the connector assembly connected with the forward-facing surface of the mounting bracket to couple the connector assembly thereto, the front end of the connector assembly extending outwardly from the forward-facing surface of the mounting bracket toward the leading edge of the panel.

12. The optical connector of claim 1, wherein the connector assembly has an optical connector module and a mounting module, whereby the mounting bracket is connected to the mounting module to couple the connector assembly thereto.

13. The optical connector of claim 1, wherein the single-piece mounting bracket has a first member and a second member at a right angle to the first member, whereby the first member is connected to the panel and the second member is connected to the connector assembly.

14. The optical connector of claim 1, wherein the panel has a leading edge and the mounting bracket is coupled with the panel at a position set back from the leading edge of the panel.

15. The optical connector of claim 1, wherein the optical connector system joins parallel panels.

16. The optical connector of claim 1, further comprising a mating connector having a latching member including an elongated blade and wherein the blade is slidably received in the slot.

17. The optical connector of claim 16, the latch member further comprising a handle and a latching feature, the handle mechanically coupled to the latching feature in a manner capable of causing the retraction of the latching features.

18. The optical connector of claim 17, further comprising a mating panel having an opening and an interior surface, wherein the latching features engage the interior surface of the mating panel upon insertion into the opening.

19. The optical connector of claim 18, further comprising at least one support frame to retain the latching features and at least one optical fiber.

20. The optical connector of claim 16, further comprising a push button release system for releasing the optical connector from its mating housing without releasing the optical connector from the panel.

21. An optical connector adapted for mounting to a panel having a top surface, the optical connector system comprising:
    a) a connector assembly containing a latching module formed by two wall members pressed together to captivate a slide member in a slot between the wall members; and
    b) a mounting bracket coupled to the panel and having an elongated portion extending outwardly from the top surface of the panel, said mounting bracket coupled to the connector assembly; wherein the mounting bracket is rigidly attached to the panel and the connector assembly is compliantly coupled to the mounting bracket via the slide member.

22. The optical connector of claim 21 wherein the mounting bracket has a projection adapted to engage a hole in the panel.

23. The optical connector of claim 21 wherein the mounting bracket has an opening therethrough, and wherein the optical connector is accessible through the opening.

24. The optical connector of claim 23 additionally comprising optical fiber passing through the opening.

25. The optical connector of claim 21, wherein the connector assembly is mounted to the panel in an electronic assembly comprising a plurality of panels in a matrix configuration.

26. The optical connector of claim 21, wherein the connector assembly is coupled to the panel in an electronic assembly, the electronic assembly further having a separator panel with an opening therethrough, the connector assembly positioned in the opening.

27. The optical connector of claim 26, wherein the connector assembly has a forward end adjacent the panel, the forward end having an opening therein adapted to receive a fastener from a mating connector.

28. The optical connector of claim 21, wherein the connector assembly extends substantially parallel to the top surface of the panel.

29. The optical connector of claim 21, wherein the connector assembly has a front end and a back end and the mounting bracket has a forward-facing surface which faces a leading edge of the panel, the back end of the connector assembly connected with the forward-facing surface of the mounting bracket to couple the connector assembly thereto, the front end of the connector assembly extending outwardly from the forward-facing surface of the mounting bracket toward the leading edge of the panel.

30. The optical connector of claim 21, wherein the connector assembly has an optical connector module and a mounting module, whereby the mounting bracket is connected to the mounting module to couple the connector assembly thereto.

31. The optical connector of claim 21, wherein the mounting bracket is a single-piece having a first member and an elongated second member at a right angle to the first member, whereby the first member is connected to the top surface of the panel and the second member is connected to the connector assembly.

32. The optical connector of claim 21, wherein the panel has a leading edge and the mounting bracket is coupled with the panel at a position set back from the leading edge of the panel.

33. The optical connector of claim 21, wherein the optical connector system joins parallel panels.

34. The optical connector of claim 21, wherein the elongated portion of the mounting bracket is parallel to a leading edge of the panel.

35. An optical connector for mounting to a panel having a top surface, the optical connector system comprising
   an elongated mounting member coupled to the panel to extend outwardly from the top surface of the panel; and
   a connector assembly having an optical connector module and a mounting module, said mounting module is formed by two wall members pressed together to captivate a slide member in a slot between the wall members, the connector assembly is compliantly engaged with the mounting member via the slide member.

36. The optical connector of claim 35, wherein the panel has a leading edge and the mounting member is engaged with the panel at a position set back from the leading edge of the panel.

37. The optical connector of claim 35, wherein the panel comprises a circuit board.

38. The optical connector of claim 35, wherein the mounting module is compliantly coupled with the optical connector module.

* * * * *